United States Patent
Li et al.

(10) Patent No.: US 10,360,420 B2
(45) Date of Patent: *Jul. 23, 2019

(54) SYSTEMS AND METHODS FOR ENABLING USER INTERACTIONS WITH WIRELESS TAGS

(71) Applicants: Disney Enterprises, Inc., Burbank, CA (US); University of Washington, Seattle, WA (US)

(72) Inventors: Hanchuan Li, Seattle, WA (US); Josh Fromm, Seattle, WA (US); Scott Hudson, Pittsburgh, PA (US); Eric Brockmeyer, Pittsburgh, PA (US); Elizabeth Carter, Pittsburgh, PA (US); Shwetak Patel, Seattle, WA (US); Alanson Sample, Pittsburgh, PA (US)

(73) Assignees: Disney Enterprises, Inc., Burbank, CA (US); University of Washington, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/990,498

(22) Filed: May 25, 2018

(65) Prior Publication Data

US 2018/0276434 A1    Sep. 27, 2018

Related U.S. Application Data

(62) Division of application No. 15/162,494, filed on May 23, 2016, now Pat. No. 10,013,589.

(60) Provisional application No. 62/276,608, filed on Jan. 8, 2016.

(51) Int. Cl.
*H04Q 5/22* (2006.01)
*G06K 7/10* (2006.01)
*G06F 16/783* (2019.01)
*G06Q 10/08* (2012.01)
*H04N 21/4223* (2011.01)

(52) U.S. Cl.
CPC ....... *G06K 7/10366* (2013.01); *G06F 16/786* (2019.01); *G06K 7/10316* (2013.01); *G06K 7/10356* (2013.01); *G06K 7/10376* (2013.01); *G06K 7/10396* (2013.01); *G06Q 10/087* (2013.01); *H04N 21/4223* (2013.01)

(58) Field of Classification Search
CPC .......... G06K 7/10366; G06K 7/10356; G06K 7/10316; G06F 17/30811; H04N 21/4223
USPC ..................................... 340/10.42
See application file for complete search history.

(56) References Cited

U.S. PATENT DOCUMENTS 10,013,589 B2 *  7/2018  Li .................. G06F 16/786
2015/0145671 A1  5/2015  Cohen \* cited by examiner

*Primary Examiner* — Tanmay K Shah
(74) *Attorney, Agent, or Firm* — Farjami & Farjami LLP

(57) ABSTRACT

There is provided a system including a wireless tag reader, a first wireless antenna, a wireless tag including an integrated circuit (IC), a conductive element electronically connecting the wireless tag to the first wireless antenna, a non-transitory memory storing an executable code, a hardware processor executing the executable code to transmit an interrogation signal, receive a tag signal from the wireless tag electronically connected to the first wireless antenna in response to the interrogation signal, the tag signal including a wireless tag identification (ID) uniquely identifying the wireless tag, and determine an interaction by a user with the wireless tag based on the tag signal.

17 Claims, 15 Drawing Sheets

SYSTEMS AND METHODS FOR ENABLING USER INTERACTIONS WITH WIRELESS TAGS

RELATED APPLICATION(S)

The present application is a Divisional Application of U.S. application Ser. No. 15/162,494, filed May 23, 2016, which claims the benefit of and priority to a U.S. Provisional Patent Application Ser. No. 62/276,608, filed Jan. 8, 2016, which is hereby incorporated by reference in its entirety into the present application.

BACKGROUND

Today, an increasing number of devices operate with wireless controls. With recent advances in wireless technology, even home appliances are being enabled to communicate wirelessly. With respect to wireless technology, power efficiency, size and ease of wireless enablement and communication remain major areas that are ripe for improvements and innovations.

SUMMARY

The present disclosure is directed to systems and methods for enabling user interactions with wireless tags, substantially as shown in and/or described in connection with at least one of the figures, as set forth more completely in the claims.

DETAILED DESCRIPTION

Figure 1:
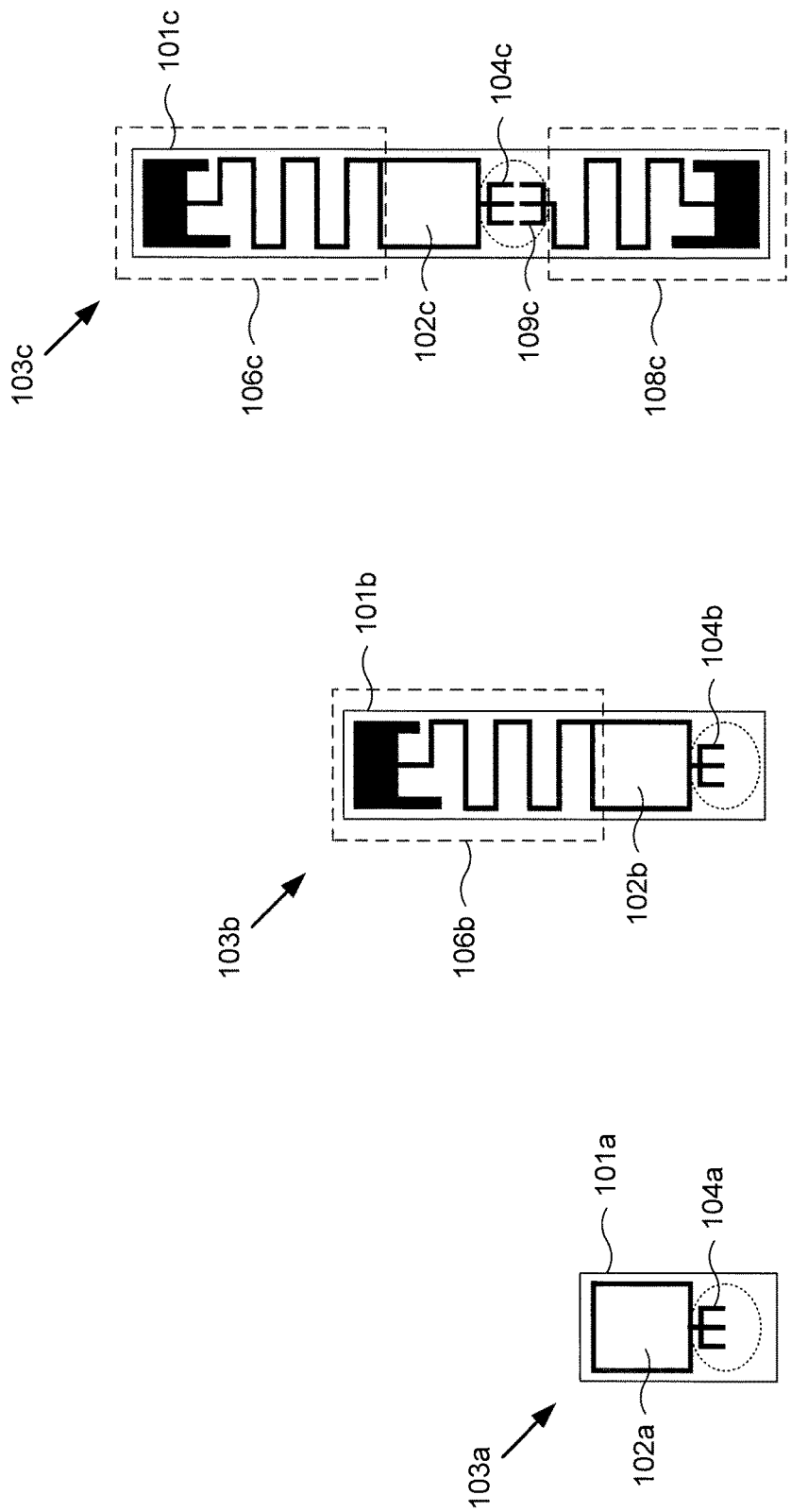
FIG. 1a illustrates a diagram of an exemplary wireless tag, according to one implementation of the present disclosure.
FIG. 1b illustrates a diagram of another exemplary wireless tag, according to one implementation of the present disclosure.
FIG. 1c illustrates a diagram of another exemplary wireless tag, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1a illustrates a diagram of an exemplary wireless tag, according to one implementation of the present disclosure. Wireless tag 103a includes substrate 101a, integrated circuit (IC) 102a, and floating connection 104a. Substrate 101a may be a paper substrate, a plastic substrate, or other substrate suitable for use with wireless tag 103a. In some implementations, IC 102a may be an ultra small form-factor, near-field ultra high frequency (UHF) radio frequency identification (RFID) tag that may be inductively coupled to a spine of floating connection 104a. Floating connection 104a is a floating connector for connecting IC 102a to an antenna, such as a monopole antenna, a dipole antenna, or for connecting IC 102a to a ground. In some implementations, a user may touch floating connection 104a, such as by placing a finger on floating connection 104a. The user's touch may create an antenna, which allows wireless tag 103a to communicate with a wireless tag reader.

FIG. 1b illustrates a diagram of another exemplary wireless tag, according to one implementation of the present disclosure. Wireless tag 103b includes substrate 101b, integrated circuit (IC) 102b electronically connected to wireless antenna 106b, and floating connection 104b. Substrate 101b may be a paper substrate, a plastic substrate, or other substrate suitable for use with wireless tag 103b. The design may form an ungrounded monopole antenna, which may perform poorly at harvesting RF energy thus making wireless tag 103b invisible to a wireless tag reader. When floating connection 104b is touched by a user, the user may act as a ground plane, which improves received signal power allowing wireless tag to 103b harvest enough power for operation. In other implementations, a user may touch floating connection 104b and function as an antenna, forming a dipole antenna enabling wireless tag 103b to communicate with a wireless tag reader, or the user may function as a ground, forming a monopole wireless antenna enabling wireless tag 103b to communicate with a wireless tag reader.

FIG. 1c illustrates a diagram of another exemplary wireless tag, according to one implementation of the present disclosure. Wireless tag 103c includes substrate 101c, integrated circuit (IC) 102c electronically connected to wireless antenna 106c, floating connection 104c, and wireless antenna 108c. Substrate 101c may be a paper substrate, a plastic substrate, or other substrate suitable for use with wireless tag 103b. Floating connections 104c and 109c are floating connectors for connecting IC 102c to antenna 108c, forming a dipole antenna. In some implementations, a user may touch floating connection 104c, such as by placing a finger of the user on floating connection 104c. The user may function as a conductive element, connecting wireless antenna 108c with IC 102c, forming a dipole antenna enabling wireless tag 103c to communicate with a wireless tag reader.

Figure 2:
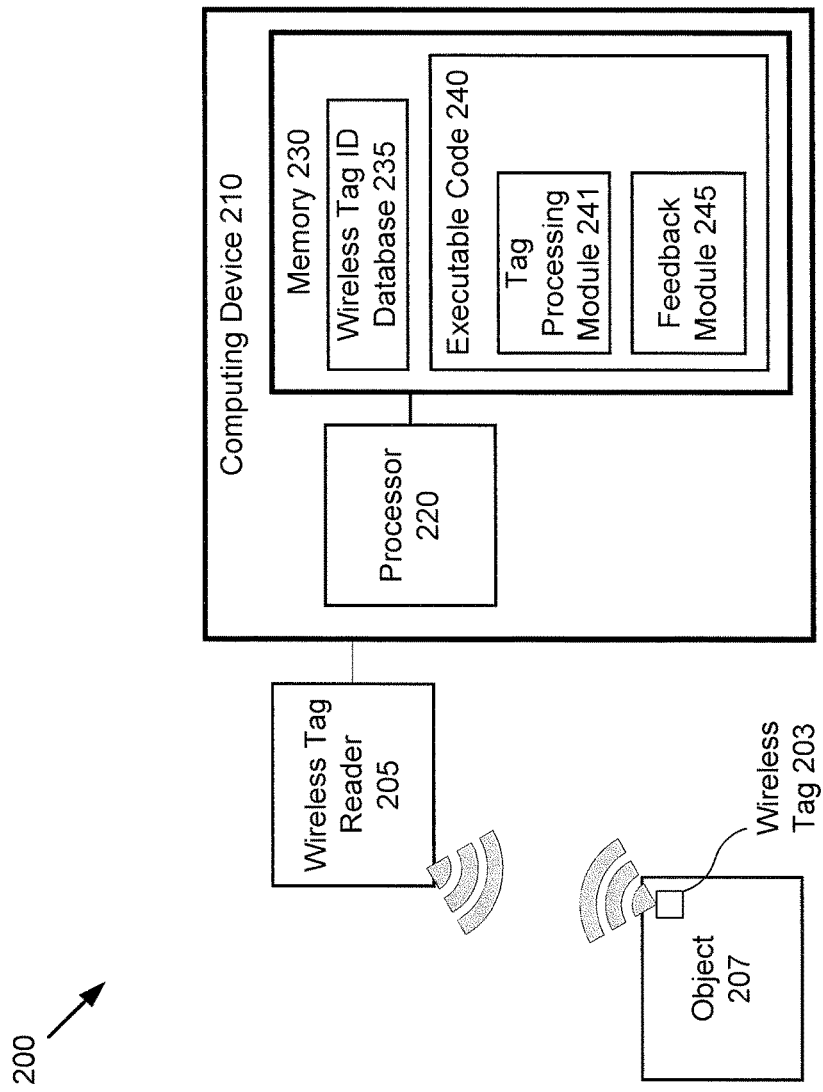
FIG. 2 illustrates a diagram of an exemplary system for enabling user interactions with the wireless tags of FIGS. 1a, 1b and 1c, according to one implementation of the present disclosure.

FIG. 2 illustrates a diagram of an exemplary system for enabling user interactions with wireless tags, according to one implementation of the present disclosure. System 200 includes wireless tag reader 205, object 207, and computing device 210. Wireless tag reader 205 may be a wireless device having a wireless transmitter/receiver coupled to an antenna for reading or obtaining information from wireless tags, such as an radio frequency identification (RFID) reader, a UHF RFID reader, an NFC antenna, at BT or BLE antenna, etc. An RFID reader includes a radio frequency transmitter and receiver, which is able to read RFID tags. In some implementations, wireless tag reader 205 may read passive or active wireless tags. Wireless tag reader 205 may transmit interrogator signals and receive authentication replies from a plurality of wireless tags, such as wireless tag 203. Wireless tag reader 205 may be used to monitor and/or track a plurality of wireless tags in a room, building, or any other environment, and may communicate with a plurality of wireless tags using a communication channel, or wireless tag reader 205 may communicate with one or more wireless tags via one or more communication channels. Each communication channel has its own particular characteristics and impairments. In some implementations, wireless tag reader 205 may detect wireless channel parameters, such as Received Signal Strength Indicator (RSSI), RF phase, and Doppler shift of the reply signal received from wireless tag 203.

Object 207 may be any item with which a human can interact and may include a plurality of physical objects. In some implementations, object 207 may be a household object, a toy, a piece of paper, etc. Object 207 may be the substrate on which wireless tag 203 is formed. In some implementations, wireless tag 203 may be adhered or attached to object 207, such as when wireless tag 203 is attached to object 207 using an adhesive. Wireless tag 203 includes electronic circuitry that is packaged and contains electronically stored information. Wireless tag 203 may be attached or adhered to object 207 for identifying object 207 based on the electronically stored information in wireless tag 203. Wireless tag 203 may be an active wireless tag, a battery-assisted passive wireless tag, or a passive wireless tag. In some implementations, wireless tag 203 may be a radio frequency identification (RFID) tag, an ultra high frequency (UHF) RFID tag, a near field communication (NFC) transmitter, or a short distance radio transmitter. Short distance radio transmissions may operate in the unlicensed industrial, scientific and medical (ISM) band at 2.4-2.485 GHz using a spread spectrum, frequency hopping, full-duplex signal at a nominal rate of 1600 hops/sec.

Wireless tag 203 may be a wireless device suited to be adhered to an object made of a certain material, such as a wireless tag designed for use with a glass object or a wireless tag designed for use with a metal object. Wireless tag 203 may include a unique RFID code that may be transmitted to or read by wireless tag reader 205 and may uniquely identify wireless tag 203. In some implementations, wireless tag 203 may include an IC coupled to a floating electrical connection, an IC coupled to a wireless antenna and a floating electrical connection, etc. Wireless tag 203 may include an IC coupled to a wireless antenna and a floating electrical connection positioned sufficiently near a second wireless antenna coupled to a floating electrical connection such that the floating electrical connections may be easily connected using a conductive element. In some implementations, connecting the floating connection may activate wireless tag 203. The conductive element may be a piece of metal or another electrically conductive material, the finger of a user touching the floating electrical connections, etc.

Computing device 210 includes processor 220 and memory 230. Processor 220 is a hardware processor, such as a central processing unit (CPU) used in computing device 210. Memory 230 is a non-transitory storage device for storing computer code for execution by processor 220, and also storing various data and parameters. Memory 230 includes wireless tag ID database 235 and executable code 240. Wireless tag ID database 235 is a database storing a plurality of wireless tag IDs each corresponding to a wireless tag, such as wireless tag 203.

Executable code 240 includes one or more software modules for execution by processor 220. As shown in FIG. 2, executable code 240 includes tag processing module 241 and feedback module 245. Tag processing module 241 is a software module store in memory 230 for execution by processor 220. In some implementations, tag processing module 241 may be a real-time data acquisition and classification program. For example, tag processing module 241 may observe changes in the physical layer signals of the communication channel between the wireless tag reader 205 and wireless tag 203, such as an RSSI, an RF phase, and a Doppler shift of wireless tag 203. The physical layer is the first layer of the Open System Interconnection Model (OSI Model). The physical layer defines the means of transmitting raw bits between wireless tag 203 and wireless tag reader 205. Tag processing module 241 may use changes in the physical layer signals of the communication channel between the RFID reader and wireless tag 203 to determine changes in a position and/or orientation of object 201, to determine when wireless tag 203 is uncovered or covered, or to infer a human interaction with object 201, etc.

Feedback module 245 is a software module stored in memory 230 for execution by processor 220 to provide feedback to a user based on the tag signal received from wireless tag 203. In some implementations, feedback module 245 may play an audio in response to the tag signal, such playing an audio to as ring a doorbell when a user touches wireless tag 203. In other implementations, feedback module 245 may display a graphic, image, or animation on a display in response to the tag signal received from wireless tag 203. For example, wireless tag 203 may be attached to a spinning pinwheel, and feedback module 245 may play an animation of particles appearing to be blown off the pinwheel, the animation changing with the rotational speed of the pinwheel. Feedback module 245 may adjust the power of the interrogation signal transmitted by wireless transmitter 205, for example, to increase the brightness of a light emitting diode (LED) that is illuminated using power harvested from the interrogation signal.

Figure 3:
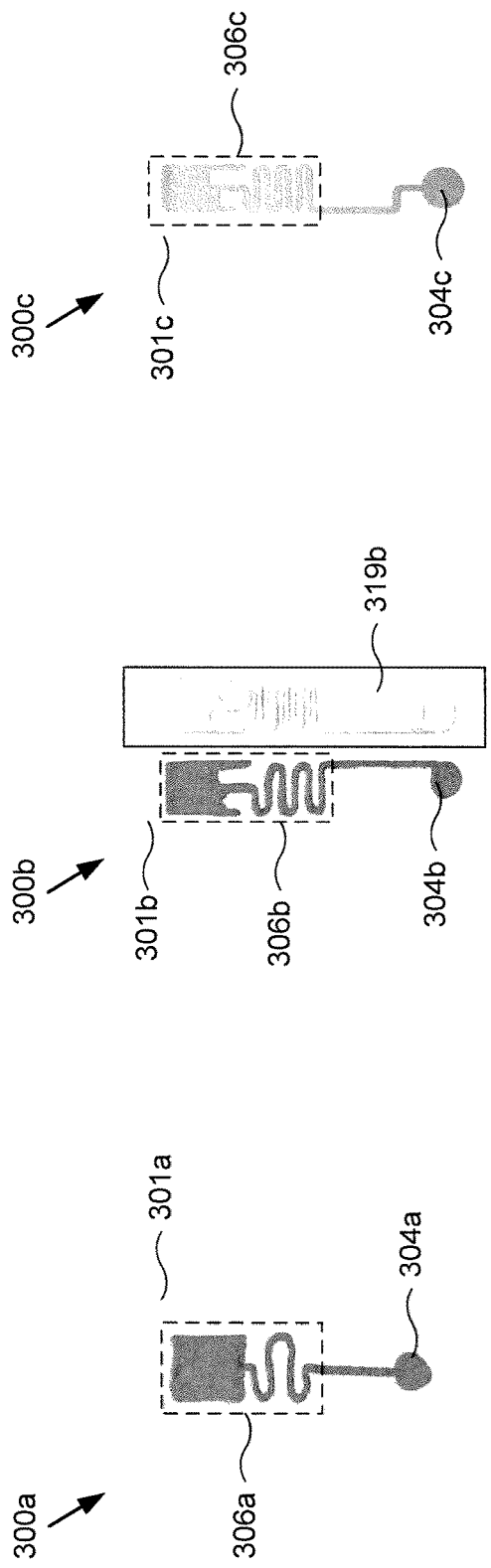
FIG. 3a illustrates a diagram of an exemplary wireless antenna for use with the system of FIG. 2, according to one implementation of the present disclosure.
FIG. 3b illustrates a diagram of another exemplary wireless antenna for use with the system of FIG. 2 and a stencil used to create the wireless antenna, according to one implementation of the present disclosure.
FIG. 3c illustrates a diagram of another exemplary wireless antenna for use with the system of FIG. 2, according to one implementation of the present disclosure.

FIG. 3a illustrates a diagram of an exemplary wireless antenna for use with the system of FIG. 2, according to one implementation of the present disclosure. Diagram 300a shows wireless antenna 306a and floating connection 304a that are hand drawn on paper substrate 301a. In some implementations, Hand drawn antennas, such as antenna 306a, may have a functional range of about six (6) meters. To facilitate creation of hand drawn wireless antennas, a plastic antenna stencil may be used by a user as a guide. Use of a stencil may help ensure consistent performance from one tag to another. In some implementations, conductive ink with a resistance of less than ten (10) ohms per inch may help ensure the hand drawn wireless antenna has reliable performance.

FIG. 3b illustrates a diagram of another exemplary wireless antenna for use with the system of FIG. 2 and a stencil used to create the wireless antenna, according to one implementation of the present disclosure. Diagram 300b depicts a stencil-drawn wireless antenna for use in a wireless tag, and includes wireless antenna 306b and floating connection 304b drawn on substrate 301b. Wireless antenna 306b and floating connection 304b were drawn using stencil 319b.

FIG. 3c illustrates a diagram of another exemplary wireless antenna for use with the system of FIG. 2, according to one implementation of the present disclosure. Diagram 300c depicts an ink-jet printed wireless antenna for use in a wireless tag, and includes wireless antenna 306c and floating connection 304c drawn on substrate 301c.

Figure 4:
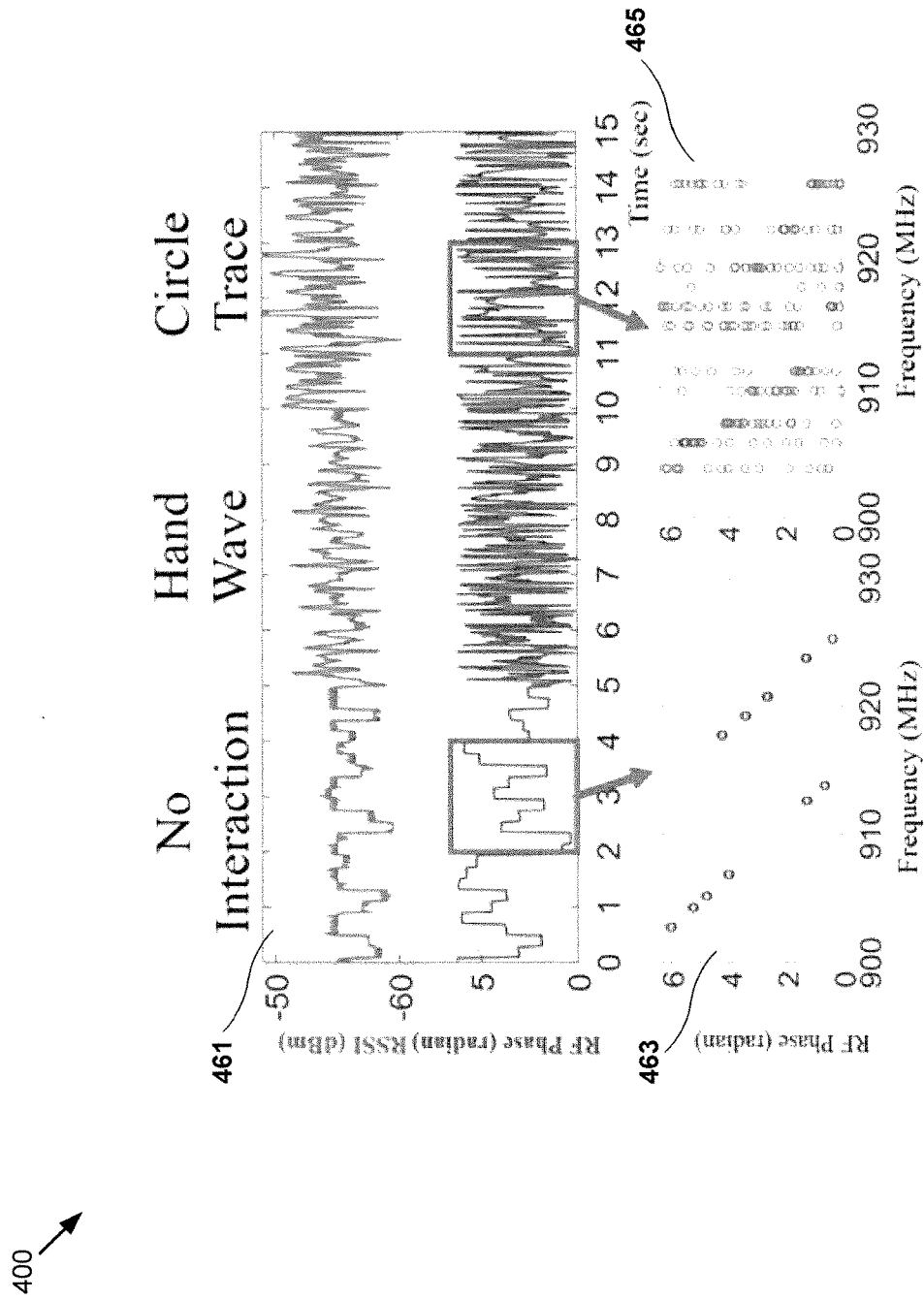
FIG. 4 illustrates a diagram of exemplary data collected for determining user interactions with a wireless tag using the system of FIG. 2, according to one implementation of the present disclosure.

FIG. 4 illustrates a diagram of data collected for enabling user interactions with a wireless tag using the system of FIG. 2, according to one implementation of the present disclosure. Panel 461 shows RF phase data for wireless tag 203 over a fifteen (15) second period. During the first five (5) seconds, wireless tab 203 was held still, followed by five (5) seconds of a user moving or waving wireless tag 203, and finishing with five (5) seconds of data gathered while the user moved wireless tag 203 in a circular trace.

In one implementation, when wireless tag 203 receives an interrogation signal from wireless tag reader 205, part of the interrogation signal is reflected back to wireless tag reader 205. This reflection is called backscatter, and RSSI is a power measurement of the backscattered signal from wireless tag 203 received by wireless tag reader 205. RSSI is predominantly determined by the distance between wireless tag 203 and wireless tag reader 205, as well as the power level of wireless tag reader 205, as shown in equation 1:

$$RSSI = 10\log(P_r) = 10\log\left(\frac{G_t\lambda^2\sigma}{(4\pi)^3 d^4}\right) + 10\log(P_t) \quad (1)$$

where $P_r$=backscatter signal power, $P_t$=reader transmit power, $G_t$=reader antenna gain, $\lambda$=carrier wavelength, $\sigma$=tag radar cross section, and d=distance between wireless tag reader 205 and wireless tag 203.

The difference in phase between the interrogation signal transmitted by wireless reader 205 and the backscattered signal from wireless tag 203 as seen by wireless tag reader 205 may provide additional insight into the state of wireless tag 203. RF phase is dominated by the antenna-tag distance d as well as signal carrier frequency f=1/$\lambda$, and repeats every wavelength. The constant shown in Equation 2 is introduced by the transmit circuits, receiver circuits, and the tag's reflection characteristic.

$$\theta = 2\pi\frac{2d}{\lambda}\mod(2\pi) + constant \quad (2)$$

The RFID read rate is defined as the number of packets received from each tag per second. Read rate can be influenced by dramatic changes in signal strength as a result of blocking or capacitive coupling of the human body. FIG. 4 shows fifteen (15) seconds of data collected from a wireless tag attached to a piece of paper, based on raw RSSI and RF phase signal streams of the wireless tag. The still state with no wireless tag interaction can be distinguished from other states by observing the RSSI and phase raw signal variations shown in panel 461, noting larger variations in RSSI as well as RF Phase signal. The first five (5) seconds of data shown in panel 461, from second zero to second five, shows the RSSI and RE Phase data when wireless tag 203 is stationary. While there is no interaction involving wireless tag 203, the discontinuity in RSSI and RF Phase data in the first five (5) seconds of panel 461 results from wireless tag reader 205 changing its transmit signal frequency. FCC regulations require RFID readers in the 915 MHz ISM band to pseudo-randomly change the frequency on which the RFID reader transmits in order to minimize interference with other devices. To satisfy this requirement, RFID readers frequency hop across fifty (50) channels from 902 MHz to 928 MHz (in the USA) at a time interval of approximately 0.2 seconds. In the second five (5) seconds, panel 461 shows RSSI and RF Phase data gathered while a user makes constant hand waving gesture in the effective near-field range, within about 10 cm, above wireless tag 203. In the third five (5) seconds, panel 461 shows RSSI and RF Phase data gathered while the user moves wireless tag 203 in a circular motion.

To better reveal the underlying characteristics of phase hidden by frequency hopping, panel 463 shows a one-second slice of RF Phase data from the still state, and panel 465 shows a one-second slice of data from the interaction state re-plotted against channel frequency. Panel 463 shows the RF phase of wireless tag 203 while the user holds wireless tag 203 still and shows the phase is linearly correlated with the carrier signal wrapped into segments within the segment [0,2$\pi$]. For the first five (5) seconds, the RF phase is linearly correlated with the carrier signal and wrapped into segments within [0,2$\pi$]. Hand waving around the tag as well as circular movement of the tag resulted in dramatic phase variations within each channel. Panel 465 shows the phase variations within each channel resulting from the user moving wireless tag 203 in a circular motion.

Figure 5:
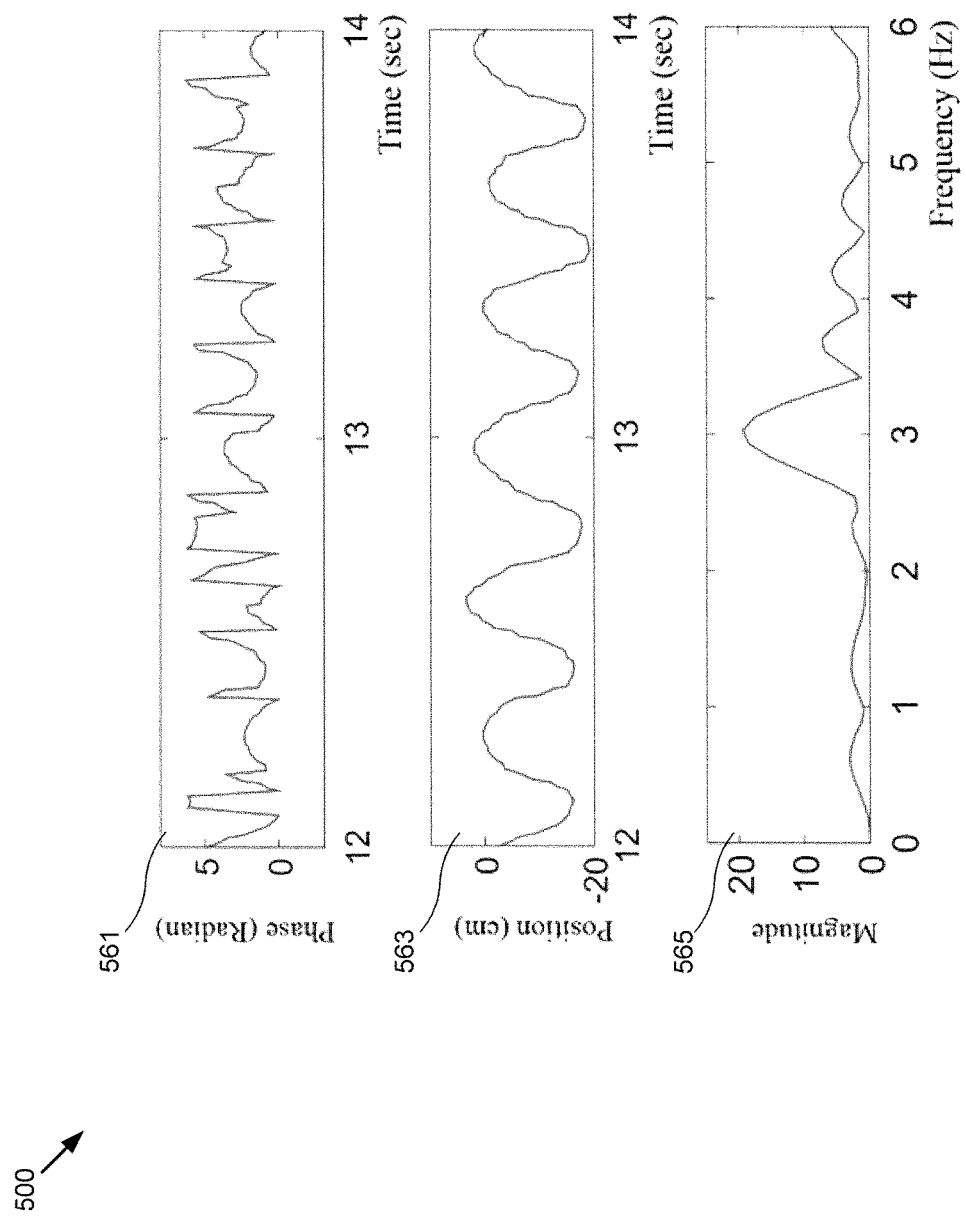
FIG. 5 illustrates a diagram of data collected for determining user interactions with a wireless tag using the system of FIG. 2, according to one implementation of the present disclosure.

FIG. 5 illustrates a diagram of data collected for enabling user interactions with a wireless tag using the system of FIG. 2, according to one implementation of the present disclosure. Diagram 500 shows a technique for tracking the movement traces of wireless tag 203 using the phase signal. This technique enables continuous tracking of the velocity, motion magnitude, and relative direction of motion of wireless tag 203 with respect to wireless tag reader 205. Panel 561 is a two-second slice depicting data from a two-second window, twelve (12) seconds to fourteen (14) seconds, in FIG. 4. According to the phase definition in Equation 2, after unwrapping the phase signals, executable code 240 can calculate the distance change d1 and d2 with the following equation:

$$d_1 - d_2 = \frac{1}{2}\frac{\lambda}{2\pi}(\theta_1 - \theta_2) \qquad (3)$$

Executable code 240 may apply Equation 3 to the phase signal in panel 561, and then apply signal smoothing between timestamps where frequency hopping occurs. Panel 563 shows the trace of data corresponding to a circular movement of wireless tag 203. According to Equation 2, distance d is the relative distance between the tag and the reader. In this case, the movement represented in the recovered trace is a one-dimensional (1D) component of the circular trace of wireless tag 203, which resembles a sine wave. In some implementations, executable code 240 may apply a Fast Fourier transform to the trace signal shown in panel 563 to calculate the frequency component of the trace in panel 565.

Figure 6A:
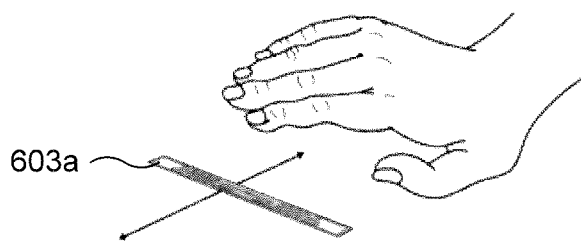
FIG. 6a illustrates a diagram of an exemplary user interaction with a wireless tag, according to one implementation of the present disclosure.

FIG. 6a illustrates a diagram of an exemplary user interaction with wireless tag 603a, according to one implementation of the present disclosure. Executable code 240 may detect a user making a waiving gesture near wireless tag 603a. Free-air waiving gesture detection may be used with wireless tag 603a or a plurality of wireless tags including wireless tag 603a. Executable code 240 may detect motions above wireless tag 603a by applying a support vector machine (SVM) classifier onto the RF signal parameters received from wireless tag 603a. In other implementations, executable code 240 may also detect the direction of waving by monitoring the sequence of variation in RF features of a plurality of wireless tags.

Figure 6B:
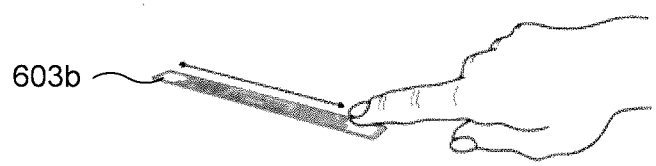
FIG. 6b illustrates a diagram of another exemplary user interaction with a wireless tag, according to one implementation of the present disclosure.

FIG. 6b illustrates a diagram of another exemplary user interaction with wireless tag 603b, according to one implementation of the present disclosure. In some implementations, executable code 240 may detect a swipe touch interaction. As shown in FIG. 6b, a swipe touch may include the interaction of a user swiping a fingertip across the surface of wireless tag 603b. This gesture may bring dramatic variation to both RSSI and phase signals, which can be characterized using our RF features. Executable code 240 may detect swipe motions across wireless tag 603b by applying an SVM classifier onto the RF signal parameters received from wireless tag 603b.

Figure 6C:
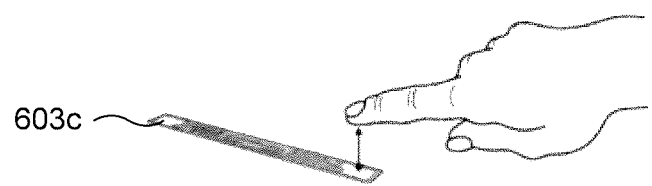
FIG. 6c illustrates a diagram of another exemplary user interaction with a wireless tag, according to one implementation of the present disclosure.

FIG. 6c shows a diagram of another exemplary user interaction with wireless tag 603c, according to one implementation of the present disclosure. Button touch interactions can be accomplished in at least two (2) different ways. In one implementation, wireless tag 603c will be affected when a finger touches either end of its antenna. This type of touch may cause a change in the RSSI and/or RF phase as reported by wireless tag reader 205, but may not block the signal such that wireless tag 603c can no longer be read by wireless tag reader 205. Using SVM, system 200 may reliably classify touch events when wireless tag 603c is still. However, if this type of button is used to prototype a remote control for a TV, it may be challenging to detect button pushes while the remote control is in motion. To overcome this limitation, wireless tag 603c may be configured using the half-antenna design, as shown in FIG. 1b. In this configuration, floating connection 104b may operate as a button or key press. Multiple tags may be set up on a single sheet of paper and a user may touch multiple buttons simultaneously. Because the actual operation of the tag is binary, it is very robust to the motion of the prototyped device the tag is on. However, since the button is normally off/momentarily on, the RFID reader may not be able to determine that the device is present until the button is pushed. If desired, a second wireless tag may be added to indicate when the button is within view of wireless tag reader 205. Executable code 240 may detect a user touching wireless tag 603c by applying an SVM classifier onto the RF signal parameters received from wireless tag 603c.

Figure 6D:
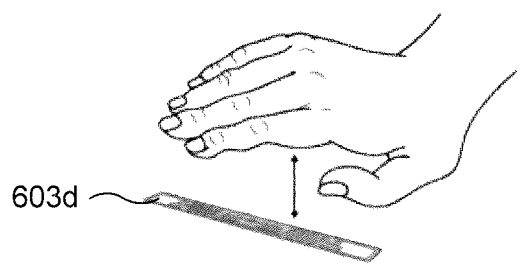
FIG. 6d illustrates a diagram of another exemplary user interaction with a wireless tag, according to one implementation of the present disclosure.

FIG. 6d illustrates a diagram of another exemplary user interaction with wireless tag 603d, according to one implementation of the present disclosure. One of the most basic RFID interaction methods is covering the RFID tag such that the signal from the reader is completely blocked or such that the tag's antenna becomes detuned to the point where it cannot receive enough power for operation. In some implementations, a user may cover wireless tag 603d with a hand of the user, or with a conductive element, like copper tape. One way to detect these cover events may be to measure the read rate of wireless tag 603d and set a threshold for activation. However, when the tag leaves the interrogation zone of the RFID reader, its read rate will also appear to drop to zero and may be registered as user input. To overcome this condition, a time-dependent interaction may be employed, such as covering the tag for a window of 1-2 seconds and then uncovering it. Executable code 240 may detect a cover touch by applying an SVM classifier onto the RF signal parameters received from wireless tag 603d.

Figure 6E:
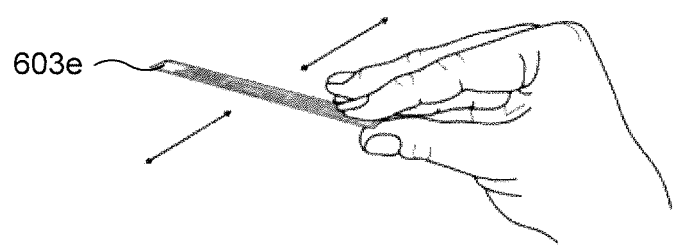
FIG. 6e illustrates a diagram of another exemplary user interaction with a wireless tag, according to one implementation of the present disclosure.

FIG. 6e shows a diagram of another exemplary user interaction with wireless tag 603e, according to one implementation of the present disclosure. In some implementations, executable code 240 may track the motion of wireless tag 603e using signal attributes, such as the RF phase and RSSI. Executable code 240 may track the motion of wireless tag 603e in the air. Free-air tracking may be applied to a paper interface of a stand-alone RFID tag where executable code 240 provides functionality for fine-grain trace tracking of wireless tag 603e relative to wireless tag reader 205, as well as frequency tracking for periodic movements. Executable code 240 may detect free-air motion of wireless tag 603e by applying an SVM classifier onto the RF signal parameters received from wireless tag 603e.

Figure 6F:
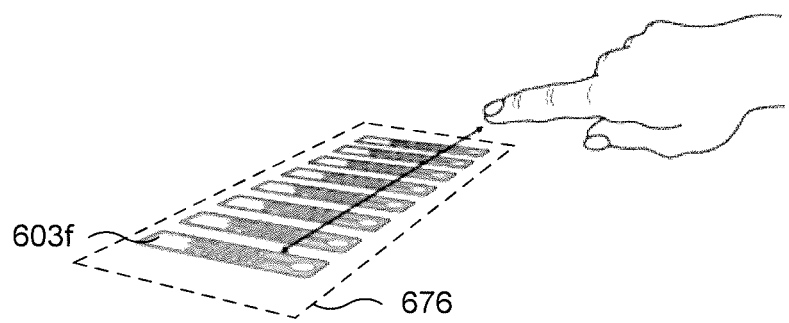
FIG. 6f illustrates a diagram of another exemplary user interaction with a wireless tag, according to one implementation of the present disclosure.

FIG. 6f illustrates a diagram of another exemplary user interaction with wireless tag 603f, according to one implementation of the present disclosure. In some implementations, wireless tag 603f may be one of a plurality of wireless tags included in a multi-tag device, such as slider 676. For the slider interface, the user may slide his or her finger across a row of button tags, including wireless tag 603f. Slider 676 may include a plurality of wireless tags with half antennas on one static layer of paper, the finger of the user may be placed near the edge of the tags. As the user moves her finger across slider 676 and contacts each static half antenna, the finger of the user may couple with each half antenna and provide enough power to backscatter signals to wireless reader 205. Thus, the reader can detect the position of the finger of the user as a discrete touch state sensor. For example, each static tag may be paired with a different user effect, such as a light bulb/LED, a sound effect, or an onscreen event that is activated by activating slider 676. Executable code 240 may detect a user touching wireless tag 603c by applying an SVM classifier onto the RF signal parameters received from wireless tag 603c.

Figure 6G:
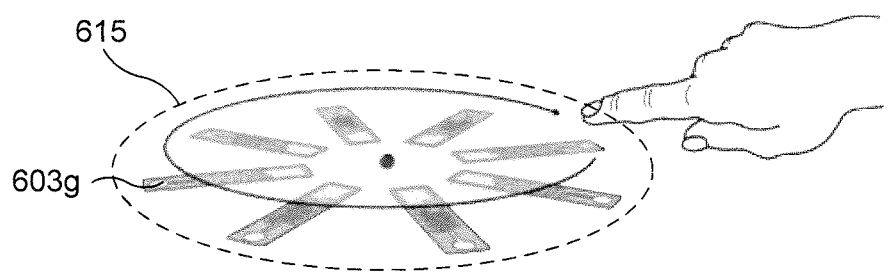
FIG. 6g illustrates a diagram of another exemplary user interaction with a wireless tag, according to one implementation of the present disclosure.

FIG. 6g illustrates a diagram of another exemplary user interaction with wireless tag 603g, according to one implementation of the present disclosure. In some implementations, wireless tag 603g may be included in rotary device 615. Rotary device 615 may include a plurality of stationary wireless tags attached to a rotary base, including wireless tag 603g, and a half antenna attached to a rotary cover. A user may rotate the rotary cover such that the half antenna is aligned with wireless tag 603g or another wireless tag of the rotary base. When the rotating half antenna aligns with wireless tag 603g, power is provided to backscatter a response signal to wireless tag reader 205. In some implementations, pressure applied by the finger of the user may cause contact between the half antenna and wireless tag 603g, or a conductive element, such as a metal conductor, may cause contact between the half antenna and wireless tag 603g.

Figure 7:
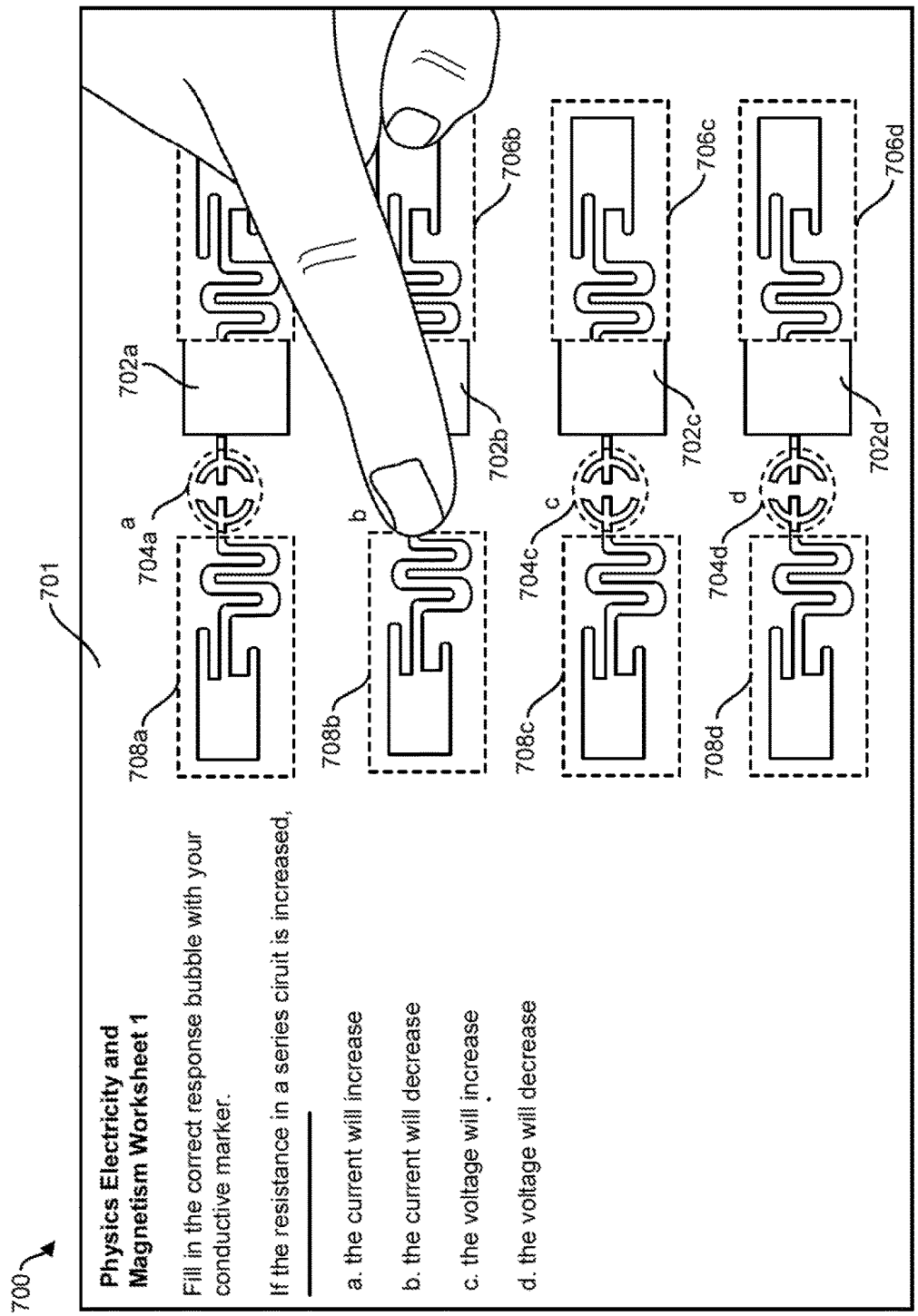
FIG. 7 illustrates an exemplary user-activation of a wireless tag, according to one implementation of the present disclosure.

FIG. 7 illustrates an exemplary use of wireless tags, according to one implementation of the present disclosure. Diagram 700 includes wireless tag 703a, wireless tag 703b, wireless tag 703c, and wireless tag 703d. Wireless tag 703a includes wireless antenna 708a, floating connection 704a, loop IC 702a, and wireless antenna 706a. Wireless tag 703b includes wireless antenna 708b and wireless antenna 706a. The finger of the user activating wireless tag 703b blocks floating connection 704b and loop IC 702b from view. Wireless tag 703c includes wireless antenna 708c, floating connection 704c, loop IC 702c, and wireless antenna 706c. Wireless tag 703d includes wireless antenna 708d, floating connection 704d, loop IC 702d, and wireless antenna 706d. A user may connect one of the half antennas to a corresponding wireless tag by connecting the corresponding floating connections. As shown in FIG. 7, a user activates wireless tag 703b by connecting loop IC 702b and antenna 708b using the finger of the user as a conductive element to bridge floating connection 704b. In other implementations, the floating connections may be bridged using, e.g., a conductive ink pen. Such an implementation may be used as a polling device, such as in a classroom for polling the students.

Figure 8:
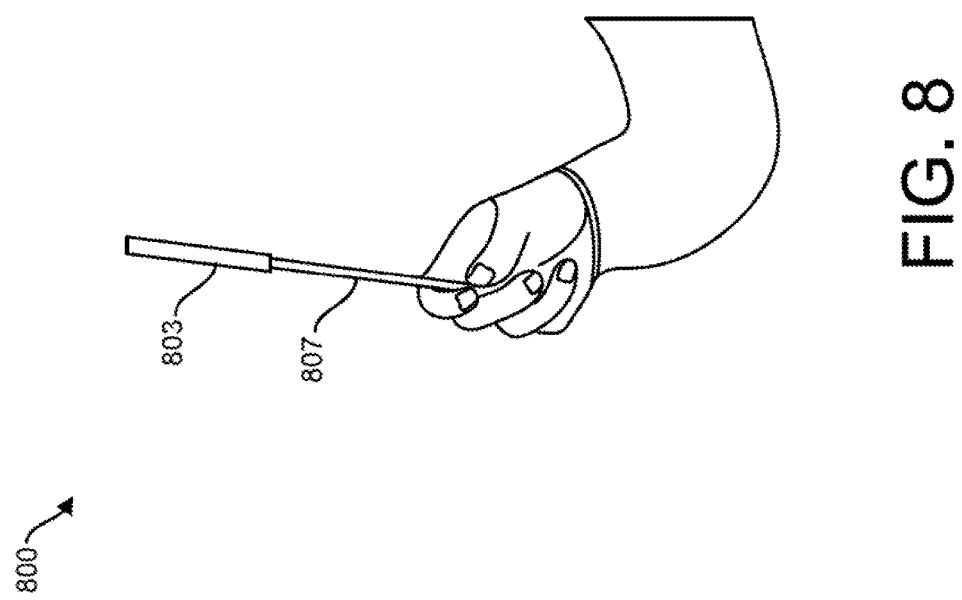
FIG. 8 illustrates an exemplary use of a wireless tag, according to one implementation of the present disclosure.

FIG. 8 illustrates an exemplary use of a wireless tag, according to one implementation of the present disclosure. Diagram 800 shows a user holding conducting wand 807 to which wireless tag 803 is attached. As the user moves wand 807, the RF channel parameters of wireless tag reader 205 streams are received by wireless tag reader 205 and processed by executable code 240 to extract wand motion in terms of frequency content and velocity, which may then be used to control a feedback provided to the user by executable code 240. In some implementations, the feedback may be music played by feedback module 245 over a speaker (not shown). The motion of wand 807 may control the tempo and/or the volume of music, for example, by the rate at which the user moves wand 807 in the air. To increase the volume of the music, the user may increase the size of the gesture, i.e., the velocity it takes to complete one repetitive swinging motion. Thus, large, repetitive gestures may cause the music to play louder, and small, repetitive gestures may cause the music play softer.

Figure 9:
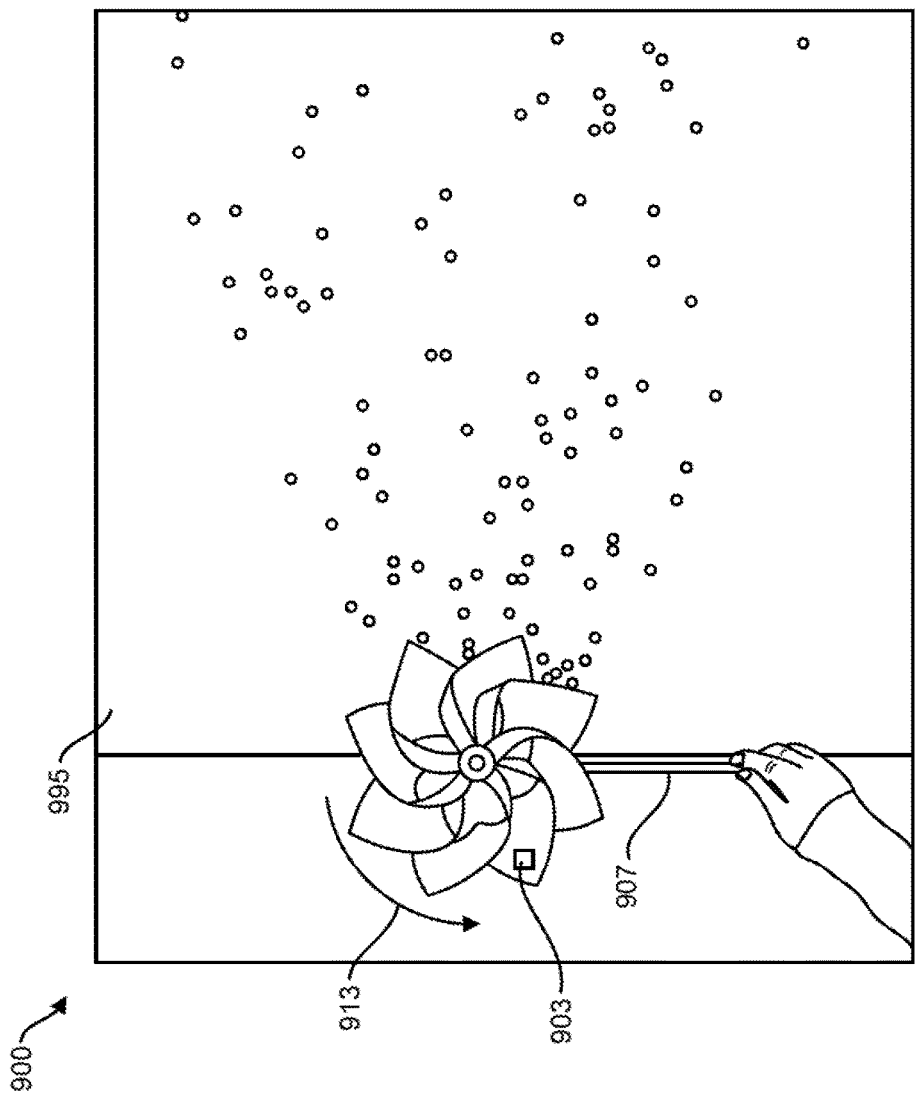
FIG. 9 illustrates another exemplary use of a wireless tag, according to one implementation of the present disclosure.

FIG. 9 illustrates an exemplary use of a wireless tag, according to one implementation of the present disclosure. Diagram 900 shows pinwheel 907, held by a user, which is rotating in the direction indicated by arrow 913. Behind pinwheel 907, display 995 shows an animation related to the motion of pinwheel 907. Executable code 240 may track the motion and/or velocity of wireless tag 903 and provide a feedback to the user in response thereto. As shown in FIG. 9, the feedback may include a graphic feedback displayed in response to the motion of wireless tag 903. A user may blow on pinwheel 907, and executable code 240 may use the velocity of wireless tag 903 to control the animation displayed on display 995.

Figure 10:
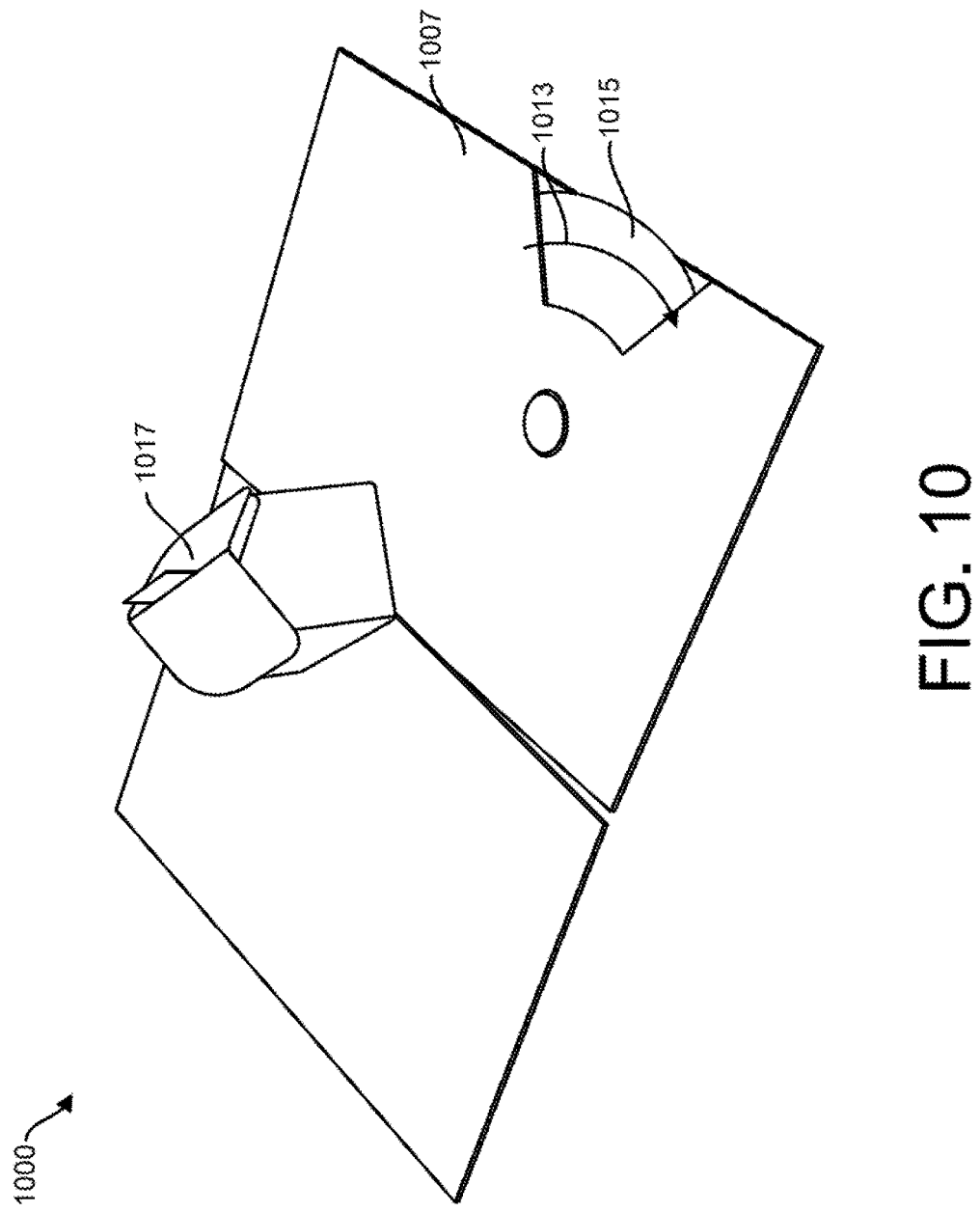
FIG. 10 illustrates another exemplary use of a wireless tag, according to one implementation of the present disclosure.

FIG. 10 illustrates an exemplary use of wireless tags, according to one implementation of the present disclosure. Diagram 1000 shows popup book 1007 including popup barn 1017 and animal wheel 1015. A user may rotate animal wheel 1015, such as in the direction of arrow 1013, to reveal different farm animals. When the picture of an animal appears, a half antenna may align with a wireless tag to transmit a corresponding response signal to wireless tag reader 205. As a feedback to the response signal, feedback module 245 may play an animal sound corresponding to the pictured animal. When the user closes the popup book, a conductive tag may cover the wireless tag, blocking the wireless tag from responding to interrogation signals transmitted by wireless tag reader 205. Such a conductive tag may be included, for example, in barn 1017 such that when the popup book is opened, the conductive tag moves away from the wireless tag, allowing the wireless tag to respond to interrogation signals.

Figure 11:
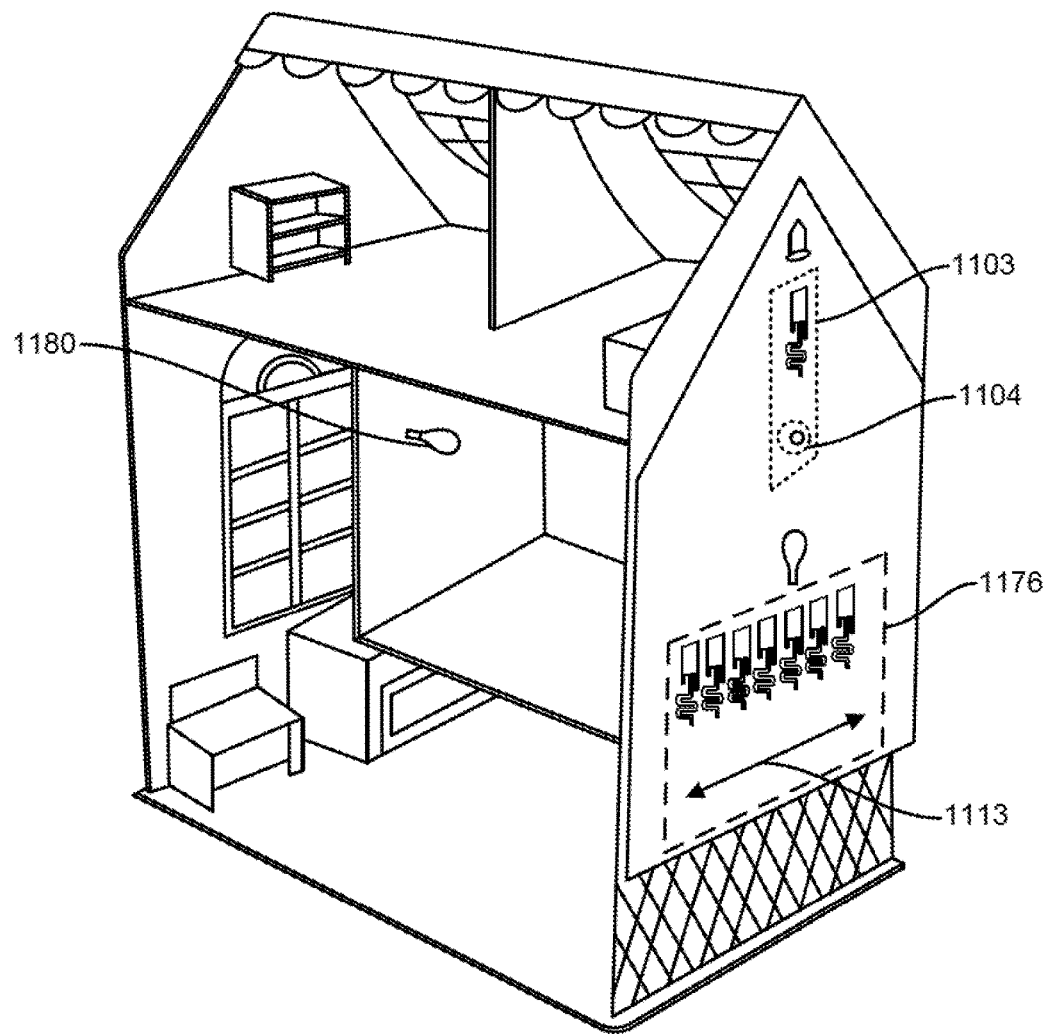
FIG. 11 illustrates another exemplary use of a wireless tag, according to one implementation of the present disclosure.

FIG. 11 illustrates an exemplary use of a wireless tag, according to one implementation of the present disclosure. Diagram 1100 shows a dollhouse including wireless tag controls for activating the doorbell of the dollhouse and controlling the lights of the dollhouse. The dollhouse shown in FIG. 11 includes wireless tag 1103, including floating connection 1104, slider 1176, and light 1180. When a user touches floating connection 1104, wireless tag 1103 may respond to an interrogation signal transmitted by wireless tag reader 205, and feedback module 245 may play a doorbell sound. Slider 1176 may control the brightness of light 1180. For example, the user may touch slider 1180 and slide the touch along arrow 1113. As a feedback to the response signal from slider 1176, feedback module 245 may adjust the brightness of light 1180, dimming light 1180 when the touch of the user slides in one direction and getting brighter when the touch of the user slides in the other direction.

Figure 12:
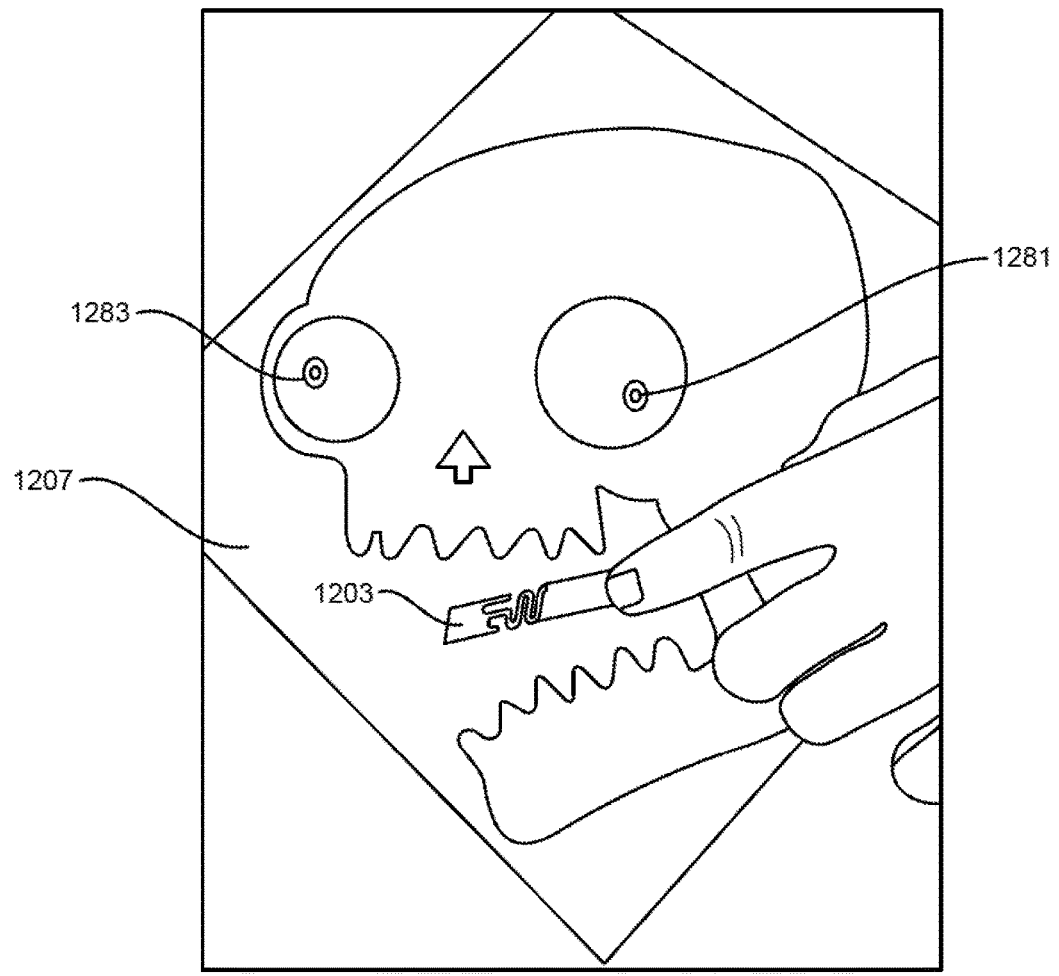
FIG. 12 illustrates another exemplary use of a wireless tag, according to one implementation of the present disclosure.

FIG. 12 illustrates an exemplary use of a wireless tag, according to one implementation of the present disclosure. As shown in FIG. 12, substrate 1207 supports wireless tag 1203 and LEDs 1281 and 1283. In some implementations, LEDs 1281 and 1283 may harvest power from the interrogation signal transmitted by wireless tag reader 205. When a user touches wireless tag 1203, feedback module 245 may increase the output power level of wireless tag reader 205 to transmit enough power to be harvested by LEDs 1281 and 1283 to turn on, creating the effect of shining eyes in the paper skull.

Figure 13:
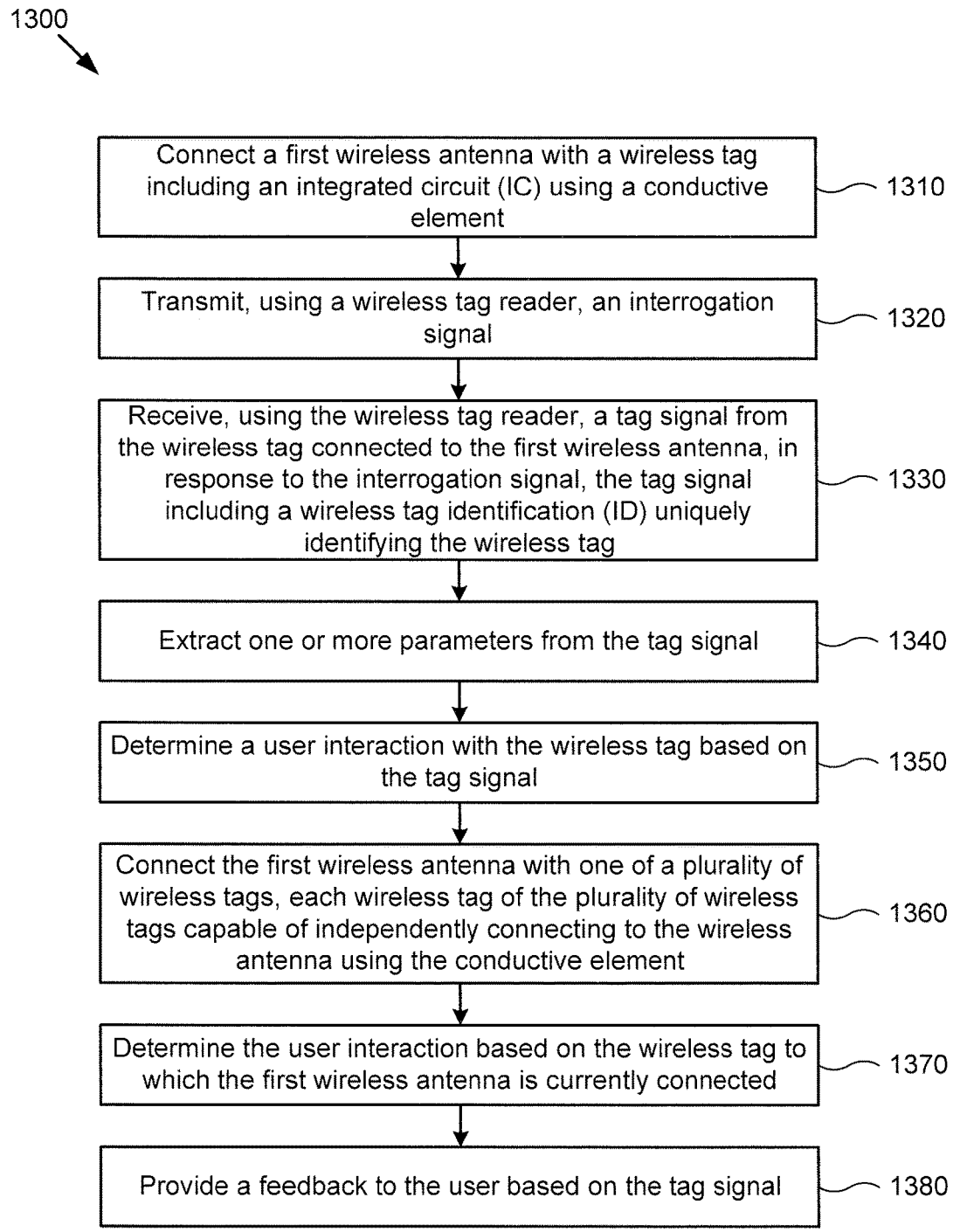
FIG. 13 illustrates a flowchart illustrating an exemplary method of enabling user interactions with wireless tags, according to one implementation of the present disclosure.

FIG. 13 shows a flowchart illustrating an exemplary method of enabling user interactions with wireless tags, according to one implementation of the present disclosure. Method 1300 begins at 1310, where a first wireless antenna is connected with a wireless tag including an integrated circuit (IC) using a conductive element. In some implementations, the conductive element may be a piece of metal, or the conductive element may be the finger of a user. For example, a user may form a monopole wireless antenna by touching floating connection 104b of wireless tag 103b, using the finger of the user as the conductive element to complete wireless tag 103b. The user may become a ground, completing a monopole antenna for wireless tag 103b, or the body of the user may function as an antenna, completing a dipole antenna for wireless tag 103b. In some implementations, the user may place a her finger such that the finger of the user touches floating connections 104c and 109c of wireless tag 103c. The finger of the user may be the conductive element that completes dipole antenna 103c.

At 1320, executable code 240 transmits, using wireless tag reader 205, an interrogation signal. The interrogation signal may be an RF signal, a WiFi signal, a Bluetooth or Bluetooth low energy signal, etc. In some implementations, the interrogation signal may pseudo-randomly change, frequency hopping across 50 channels from 902 MHz to 928 MHz at a time interval of approximately 0.2 seconds.

At 1330, executable code 240 receives, using wireless tag reader 205, a tag signal from wireless tag 203 connected to the first wireless antenna, in response to the interrogation signal, the tag signal including a wireless tag identification (ID) uniquely identifying the wireless tag. In some implementations, the input signal may be an authentication reply transmitted by wireless tag 203. In other implementations, the authentication reply may be a signal that is backscattered by wireless tag 203, such as a backscattering of the interrogation signal.

At 1340, executable code 240 extracts one or more parameters from the tag signal. In some implementations, wireless tag reader 205 may be capable of reporting channel parameters such as RSSI, RF phase, and Doppler shift, as well as the wireless tag ID of each wireless tag and a timestamp of the tag read. For example, to retrieve the data streams including the channel parameters extracted from the received signal, system 200 may utilize a reader communication software in C# using Octane SDK provided by IMPINJ®. In some implementations, the channel parameters reported by wireless tag reader 205 may represent a unique signature of the RF environment of wireless tag 203. Each time a tag is read, wireless tag reader 205 may measure these physical layer channel parameters and report them along with the wireless tag EPC and the transmit frequency to executable code 240. By observing changes in these parameters over time, inferences can be made about the state of wireless tag 203 and thus object 207, to which wireless tag 203 is attached.

RSSI is a measurement of the signal power received at wireless tag reader 205 and may be predominantly affected by changes in the distance between wireless tag 203 and wireless tag reader 205. In some implementations, changes in RSSI may be predominantly caused by changes in the distance between wireless tag reader 205 and wireless tag 203 as well as the orientation of wireless tag 203. As multipath increases the spatial variation in RSSI, there is a greater likelihood of detecting motion events. Executable code 240 may identify changes in Standard Deviation of RSSI, Mean of RSSI Standard Deviation within each frequency, and mean of difference between neighboring RSSI to detect motion events using RSSI.

RF phase is a measure of the phase angle between the interrogation signal transmitted by wireless tag reader 205 and the tag signal received from wireless tag 203. RF phase may be affected by small changes in distance between wireless tag 203, and wireless tag reader 205 and/or in carrier frequency, and may repeat every wavelength. RF phase may be sensitive to smaller changes in distance between the wireless tag 203 and wireless tag reader 205 and may be particularly useful for detecting translational motion. Since wireless tag reader 205 performs many tag reads on a single frequency before hopping to the next channel, changes in the RF phase may be a good indicator of an interaction event.

Read rate of wireless tag 203 may be the number of times each second that wireless tag reader 205 is able to read wireless tag 203, such as the number of packets received from wireless tag 203 per second. A cover event on wireless tag 203 may significantly weaken the received signal strength, which may result in a decreased read rate. For example, read rate of wireless tag 203 when uncovered may range from 15 to 40 reads per second, while the read rate when wireless tag 203 is partially or fully covered may be less than about 10 reads per second. The read rate of wireless tag 203 may be used to determine whether wireless tag 203 is covered or uncovered. Doppler shift may be the frequency shift between the signal transmitted by wireless tag reader 205 and a reflected signal, and may be caused by quickly moving objects. Doppler shift may be used in a number of radio sensing scenarios to infer the relative motion of wireless tag 203 and wireless tag reader 205. Method 1300 continues at 1350, where executable code 240 determines a user interaction with the wireless tag based on the tag signal.

At 1360, a conductive element connects the first wireless antenna with one of a plurality of wireless tags, each wireless tag of the plurality of wireless tags capable of independently connecting to the wireless antenna using the conductive element. In some implementations, wireless tag 203 may be in a fixed position, such as fixed on a base element of a rotary input device, and the rotor element of the rotary input device may include a plurality of wireless antennas. When the rotary element of the rotary input device is rotated, each of the plurality of wireless antennas may independently connect to wireless tag 203 at various points in the rotation. In other implementations, the first antenna may be one of a plurality of antennas in a slider input device. The conductive element may be a piece of metal on a mechanical slider, or the conductive element may be a finger of a user. As the conductive element moves over the slider input device, the first antenna may be connected to wireless tag 203.

At 1370, executable code 240 determines the user interaction based on the wireless tag to which the first wireless antenna is currently connected. For example, executable code 240 may determine a user interaction with a rotary input device using the tag signal transmitted by wireless tag 203. Executable code 240 may determine a user interaction with a slider in put device based on the tag signal received from wireless tag 203 and one or more other wireless tags in the slider input device.

At 1380, executable code 240 provides a feedback to the user based on the tag signal. In some implementations, the feedback may include adjusting the brightness of a light, such as an LED, adjusting the color of a light, such as by changing the hue of a full-color spectrum light. In other implementations, feedback module 245 may display a graphic or animation on a display, such as display 995. The graphic or animation may be related to the user interaction with wireless tag 203, such as an animation of particles flying off a pinwheel when a user blows to spin the pinwheel.

In other implementations, feedback module 245 may play an audio in response to the user interaction.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for use by a wireless tag including a planar substrate having a first side and a second side opposite the first side, a first antenna formed on a first side of the substrate, an integrated circuit (IC) electronically coupled to the first antenna, and a first floating connection formed on the first side of the substrate and electronically connected to the IC, the method comprising:
   receiving, from a wireless tag reader by the wireless tag, an interrogation signal,
   generating a tag signal, by the wireless tag, in response to a first floating connection of the wireless tag completing a wireless tag circuit when grounded using a human body part, the tag signal including a wireless tag identification (ID) uniquely identifying the wireless tag;
   transmitting the tag signal to the wireless tag reader by the first antenna of a wireless tag, in response to the interrogation signal.

2. The method of claim 1 further comprising:
   completing the wireless tag circuit using the first floating connection when directly touched by the human body part or indirectly using a conductive element in contact with the human body part.

3. The method of claim 1, wherein the wireless tag further includes a second wireless antenna formed on the substrate, the second wireless antenna including a second floating connection forming a dipole antenna by connecting to the first floating connection.

4. The method of claim 3 further comprising:
   forming the first wireless antenna and the second wireless antenna on the substrate by one of hand drawing with conductive ink, stenciling using conductive ink, and printing using conductive ink.

5. The method of claim 1 further comprising:
   completing the wireless tag circuit using the first floating connection when touched by the human body part; and
   floating the first floating connection and not completing the wireless tag circuit when not touched by the finger.

6. A method for use by a wireless tag reader, the method comprising:
   transmitting, by the wireless tag reader, an interrogation signal;
   receiving, from a first wireless antenna of a wireless tag by the wireless tag reader, a tag signal in response to the interrogation signal, wherein the tag signal is generated by the wireless tag in response to a first floating connection of the wireless tag completing a wireless tag circuit when grounded using a body part of a user, the tag signal including a wireless tag identification (ID) uniquely identifying the wireless tag; and
   determining, by the wireless tag reader, an interaction by the user with the wireless tag based on the tag signal.

7. The method of claim 6, wherein the interaction is one of a wave, a swipe, a touch, a cover touch, and a wireless tag movement.

8. The method of claim 6, wherein the system further comprises a plurality of wireless tags including the wireless tag, wherein each of the plurality of wireless tags independently connects with the first wireless antenna, the method further comprising:
   determining, by the wireless tag reader, the interaction based on the wireless tag to which the first wireless antenna is currently connected.

9. The method of claim 6 further comprising:
   providing, by the wireless tag reader, a feedback to the user based on the tag signal.

10. The method of claim 9, wherein the feedback includes at least one of an audio feedback and a visual feedback.

11. The method of claim 6, wherein the body part is a finger of the user.

12. A wireless tag reading system comprising:
   a wireless tag having a first wireless antenna, a first floating connection, a wireless tag circuit, and a wireless tag identification (ID) uniquely identifying the wireless tag;
   a wireless tag reader having a transmitter configured to transmit an interrogation signal, and a receiver configured to receive, from the first wireless antenna of the wireless tag, a tag signal in response to transmitting the interrogation signal;
   wherein the wireless tag is configured to generate the tag signal in response to the first floating connection of the wireless tag completing the wireless tag circuit when grounded by a user; and
   wherein the wireless tag reader is configured to determine an interaction by the user with the wireless tag based on the tag signal.

13. The wireless tag reading system of claim 12, wherein the interaction is one of a wave, a swipe, a touch, a cover touch, and a wireless tag movement.

14. The wireless tag reading system of claim 12, wherein the system further comprises a plurality of wireless tags including the wireless tag, wherein each of the plurality of wireless tags independently connects with the first wireless antenna, and wherein the wireless tag reader is further configured to determine the interaction based on the wireless tag to which the first wireless antenna is currently connected.

15. The wireless tag reading system of claim 12, wherein the wireless tag reading system is configured to provide a feedback to the user based on the tag signal.

16. The wireless tag reading system of claim 15, wherein the feedback includes at least one of an audio feedback and a visual feedback.

17. The wireless tag reading system of claim 12, wherein the first floating connection is grounded by a finger of the user.

* * * * *